Patented July 15, 1941

2,248,964

UNITED STATES PATENT OFFICE 2,248,964

METHOD FOR PRODUCING QUICK-DRYING OILS

Frank W. Corkery, Crafton, Pa., assignor to Falk and Company, a corporation of Pennsylvania No Drawing. Application May 23, 1938, Serial No. 209,533

12 Claims. (Cl. 260—406)

This invention relates to the conversion of oils having drying qualities into a condition in which the drying qualities of the oil have been improved in such order as to give a product of novel sort.

It should be borne in mind in considering my invention that the drying, and semi-drying oils are none of them unitary in their chemical constitution, but that each comprises a plurality of compounds differing widely in their ability to receive oxygen into their structure. Thus, amongst this broad class of oils, China-wood oil may be considered to be the quickest drying oil which is commercially abundant since it contains a high proportion of glycerides of unsaturated fatty acids, and has also a chemical structure rendering it peculiarly susceptible to drying by polymerization as well as oxidation; while amongst the commercial semi-drying oils, soya bean oil has a relatively low content of such glycerides of unsaturated fatty acids. While, therefore, China-wood oil dries with great rapidity when spread, to form a hard, dry film; semi-drying oils, such as soya bean oil and oils approaching soya bean oil in their chemical composition, dry very slowly when spread, and their films tend indefinitely to retain a surface tackiness. The foregoing is well known to those skilled in the art of making paint and varnish, but is here noted as a circumstance to be borne in mind in arriving at a full understanding of my invention.

It is also well known that the rate of drying of those oils containing a high percentage of chemical constituents capable of receiving a relatively great quantity of oxygen into their chemical structure may be increased by preoxidation, and that preoxidation may be effected by blowing through them air, or other gas containing free oxygen. This susceptibility has been, however, limited rather stringently by the tendency of a batch of oil subjected to blowing to gel in the blowing vessel.

In the case of semi-drying oils, this limitation is of serious moment, and it has been my previous experience that a semi-drying oil could not by blowing be converted into an oil of good drying qualities. This has been for the reason that such oils contain so high a percentage of constituents substantially unaffected by oxidation that the oxidizable constituents tend to pass into an insoluble state without, at any stage of the blowing, being capable of imparting to the body of oil, as a whole, good drying qualities. In the case of semi-drying oils, blowing has, therefore, been depended upon merely to improve the odor, clarity, and body of the oils, and has not been practiced in the hope of imparting good drying qualities to those oils.

Primarily my invention consists in so blowing oils of drying or semi-drying character that the oil as a whole is brought to a definitely higher order in its drying characteristics, both as to rate of drying and hardness of film. This I do by effecting in the oils greatly increased preoxidation, while avoiding gelation and other undesirable effects. By the term "gelation," as herein used, it is to be understood that I mean such bodily gelation in a blowing vessel, or in containers, that the oil becomes a semi-solid, substantially infusible and insoluble mass, and that I do not by that term refer to the mere formation of a gel structure in the oil.

Briefly to summarize my invention, I place the oil to be treated in a blowing vessel, and blow an oxygen-containing gas, such as air, through it while heating the oil to a temperature sufficiently high to facilitate air dispersion through the batch, but below a temperature tending to promote polymerization in the oil. When oxidation has been carried to a stage at which the viscosity of the oil has been greatly increased, and gelation becomes imminent, I add to the batch, in large proportion, a raw oil; and thus disperse the gel structure formed up to that stage by oxidation, and then blow further.

The addition of the raw oil at a time when the end of the usually permissible blowing treatment has been approached, substantially reduces the viscosity of the batch, due not only to the addition of an oil of normal viscosity but also to the gel dispersing effect of the added raw oil. A substantial further period of blowing then follows, and may be continued as long as it is possible so to do without incurring danger of gelation. It is this further period of blowing, following gel-dispersion in the batch, which results in such preoxidation of the oil as greatly to facilitate its drying when spread in a film, and to improve the character of the film. My invention may well be illustrated by giving examples of the treatment of several different drying, and semi-drying, oils as follows:

Example No. 1

Placing 4000 pounds of raw soya bean oil in a blowing vessel, air was blown through it at the standard rate of blowing of about 1.65 cubic feet of air per hour for each pound of oil. The temperature of the batch was maintained at about 300° F. After blowing for between 10 to 12 hours (varying slightly in different specific runs, but generally about 12 hours) the batch was found to have a viscosity of more than 2500 and less than 3000 Saybolt seconds at 210° F. (Saybolt Furol viscosimeter). As the viscosity of an oil undergoing oxidation by blowing increases with great rapidity after it reaches 3000 Saybolt seconds, with an attendant danger of gelation, at that stage there was added 4000 pounds of raw soya bean oil. This addition reduced the viscosity of the batch to about 500 Saybolt seconds.

After addition of the raw oil, blowing was continued at the same rate for about 6 hours, bringing the batch of oil to a viscosity of about 1500 Saybolt seconds. This represents substantially the maximum stage of preoxidation to which the oil may be brought without incurring danger of gelation.

The product is a drying oil, having the approximate drying qualities of a good grade raw linseed oil. When spread it dries in about 15 hours to form a hard film, without surface tackiness. This is to be compared with raw soya bean oil, which dries in about one week to form a relatively soft, tacky, film.

Example No. 2

Placing 4000 pounds of raw sardine oil in a blowing vessel, air was blown through it at the standard rate of blowing of about 1.65 cubic feet of air per hour for each pound of oil. The temperature of the batch was maintained about 300° F. After blowing for about 7 hours, the batch was found to have acquired a viscosity of more than 2500 and less than 3000 Saybolt seconds at 210° F. (Saybolt Furol viscosimeter). At this stage I added 4000 pounds of raw sardine oil, reducing the viscosity of the complete batch to about 300 Saybolt seconds. Blowing was continued at the same rate for about 5 hours to bring the batch to a viscosity of about 1500 Saybolt seconds.

The product is an oil drying in about 8 hours, as compared with a drying time of 10 to 15 hours for a film of raw sardine oil. The film is hard and dense when dry, corresponding closely in its qualities to a dried film of raw Perilla oil. In the case of this oil the most striking improvement is in the character of the film which is formed, since raw sardine oil forms a soft, tacky, film when dry. Sardine oil here given as the starting material for my method, should be taken as exemplary of fish oils generally, such as menhaden oil and pilchard oil.

Example No. 3

Placing 4000 pounds of raw sunflower seed oil in a blowing vessel, air was blown through it at the standard rate of blowing of about 1.65 cubic feet of air per hour for each pound of oil. The temperature of the batch was maintained at about 300° F. After blowing for about 8 hours, the batch was found to have acquired a viscosity of more than 2500 and less than 3000 Saybolt seconds at 210° F. (Saybolt Furol viscosimeter). At this stage I added 4000 pounds of raw sunflower seed oil, reducing the viscosity to about 500 Saybolt seconds. Blowing was continued at the same rate for about 5 hours, to bring the batch to a viscosity of about 1500 Saybolt seconds.

The product is an oil drying in about 8 hours, as compared with a drying time of 10 to 15 hours for a film of raw sunflower oil. The film is hard and dense when dry, corresponding closely in its qualities to a dried film of raw Perilla oil. In the case of this oil, the most striking improvement is in improved hardness of a dried film of the oil.

Example No. 4

Placing 4000 pounds of raw Perilla oil in a blowing vessel, air was blown through it at the standard rate of blowing of about 1.65 cubic feet of air per hour for each pound of oil. The temperature of the batch was maintained at about 300° F. After blowing for about 5 hours, the batch was found to have acquired a viscosity of more than 2500 and less than 3000 Saybolt seconds at 210° F. (Saybolt Furol viscosimeter). At this stage I added 4000 pounds of raw Perilla oil, reducing the viscosity of the complete batch to about 500 Saybolt seconds. Blowing was continued at the same rate for about 2 hours, bringing the batch to a viscosity of about 1500 Saybolt seconds.

The product is an oil drying in about one hour, as compared with a drying time of about 8 hours for raw Perilla oil. The film formed by this oil corresponds closely to a China-wood oil film being a particularly hard, dense, and glossy varnish film.

The products of all the foregoing examples are oils possessing highly developed, although well dispersed, gel structures. They have excellent priming qualities, and anchor well to the surface of permeable materials, such as the various types of wall board, highly porous wood and the like bases. If it be desired to obtain oils, substantially improved in their rate of drying and in the character of the film formed by them, while retaining a lower viscosity, I am able to make such oils by tempering the final blowing treatment to which the batch is subjected after addition of the gel-dispersing charge of raw oil. Examples of this modified practice may be given as follows:

Example No. 5

Taking a batch of 4000 pounds of raw soya bean oil, I blew this oil under conditions identical to those described in Example No. 1, and brought it to the same viscosity stage. After the addition of 4000 pounds of raw soya bean oil, blowing was continued under the same conditions for about 3 hours, bringing the batch to a viscosity of about 800 Saybolt seconds. The film of the oil dried in from 12 to 15 hours, retaining a scarcely perceptible surface tack, but otherwise forming a good film.

Example No. 6

A batch of 4000 pounds of raw sardine oil was blown under the conditions and for the length of time described in Example No. 2. After the addition of 4000 pounds of raw sardine oil, blowing was continued for about 2 hours, bringing the oil to a viscosity of about 500 Saybolt seconds.

The product was an oil drying in about 8 hours to a hard, dense film.

Example No. 7

Taking a batch of 4000 pounds of raw sunflower seed oil, this oil was blown under conditions and for a length of time identical with those described in Example No. 3. After addition of 4000 pounds of raw sunflower seed oil, blowing was continued for a period of 2 hours, bringing the batch to a viscosity of about 800 Saybolt seconds.

The product was an oil drying in about 7 hours to a dense, hard film, without surface tackiness.

In any instance in which Saybolt viscosity is given in the foregoing examples, or elsewhere in the specification and claims, without specific reference to the temperature at which the viscosity is taken, and the instrument used for taking the viscosity, it is to be understood that the temperature intended is 210° F., and the instrument is the Saybolt Furol viscosimeter.

It should be explained that the drying times given herein are based upon tests made in accordance with an accepted procedure for the estimation of rates of drying. This test consists in bringing the blown oil back to the viscosity of a corresponding raw oil by the addition of a suitable solvent; adding selected oil-soluble lead, cobalt, or manganese driers according to the common choice of the art of a particular drier for a particular oil and in the quantity in which they are thus commonly employed; and spreading the material in a thin film, so that after drying the film thickness is between 0.002 and 0.004 of an inch. Drying is effected at 77° F., and 50% relative humidity.

My method is of particularly great importance as practiced upon the various oils of animal, vegetable, or marine origin, known as semi-drying oils, and which include as their most widely known and used members whale oil, menhaden oil, sardine oil, pilchard oil, sunflower seed oil, soya bean oil, safflower oil, hemp seed oil, poppy seed oil, walnut oil and rapeseed oil. It is to be emphasized with respect to these oils that a blowing treatment conducted in usual manner is of but relatively slight effect in improving the drying qualities of the oils, and the character of the films formed by them. The effect of blowing in the usual manner, as above-noted, is chiefly to increase the body and decrease the ability of the oil to penetrate, with improvement in the odor and clarity of the oils, and with but slight attendant improvement in their drying qualities. By practicing my method, these oils, of initially less desirable character, may be used interchangeably with the formerly more desirable, and more expensive, oils, such as linseed oil and Perilla oil.

As practiced upon an oil of good drying qualities, such as Perilla oil and linseed oil, treatment according to my method results in a product having the varnish characteristics of cooked China-wood oil, and usable interchangeably with cooked China-wood oil. They present advantage over China-wood oil, in that they have greater stability, with decreased tendency to skin deeply when exposed to air.

It will be noted that in every example the temperature at which the blowing is conducted is given as about 300° F. There is no necessity for this specific temperature, save that it is a temperature adequate for blowing, at which no substantial polymerization is promoted in the oil subjected to oxidation. In practicing my method, on any of the drying or semi-drying oils, there should be such limitation of the blowing temperature that no substantial polymerization is effected, since such polymerization defeats the purpose of the treatment, by detracting from the drying qualities of the oil produced. A temperature of 300° F. is one which does not promote polymerization in any of the oils given as exemplary, but it will be understood that, giving consideration to the particular oil subjected to treatment, high temperature may be employed if so desired.

In the examples the proportion of raw oil added to the oil already included in the batch, and subjected to oxidation is equal to the initial weight of the batch, thus giving a final batch of 50% oil already subjected to oxidation and 50% raw oil. The addition of raw oil in a weight equal to 20% of the total batch may be considered to be the minimum proportional addition of raw oil permitting blowing to be continued in the batch to an extent giving results presenting appreciable advantage. A ratio of about one to one of initially blown oil and raw oil may be considered to be optimum for all the oils upon which my method may advantageously be practiced. On the other hand if the oil initially subjected to oxidation be less than about 30% of the total batch, substantial advantage for my method is not obtained, since the preformed gel structure produced in the oil by the initial blowing is thus decreased to such a proportion that the process approximates in its character a simple blowing operation of previously known sort.

It should be explained that it is not necessary to bring the portion of the batch which is initially subjected to oxidation specifically within the viscosity range of 2500 Saybolt seconds to 3000 Saybolt seconds. Advantage is obtained in any variation of my method in which the preoxidation in the oil during the initial stage of my method is substantial, as evidenced by substantial increase in the viscosity of the oil. Also 3000 Saybolt seconds is not to be considered the maximum viscosity to which the oil may be brought in the initial stage of the process without causing gelation. In viscosity seconds some oils may be carried much further without gelation, but increase in viscosity proceeds so rapidly with continued blowing after a viscosity of about 3000 Saybolt seconds has been reached, that a viscosity of 3000 Saybolt seconds has been taken as useful in providing a practical upper limit giving assurance against gelation for all the oils subjected to treatment.

The secondary, or final, blowing is useful when continued for a length of time sufficient to produce in the complete batch substantial additional oxidation, evidenced by substantial increase in the viscosity of the batch from that existing immediately after adding the raw, gel-dispersing portion of the batch. It is thus possible to provide a specific viscosity from any point substantially above a viscosity of about 300 Saybolt seconds to one of about 1500 Saybolt seconds, while obtaining in some measure the advantages of my method.

It is a fact that the paint and varnish trade prefers to utilize oils having a single origin, rather than blends of oils, and for this reason my commercial examples above given have been concerned in each run with producing a product which is wholly soya bean oil, wholly fish oil, or wholly of some other single oil subjected to treatment in accordance with my method. It is to be understood, however, that two or more of the drying, or semi-drying, oils may be blended at some stage or other of my process. Thus the total batch subjected to treatment may, for example, consist of a blend of sunflower seed oil and soya bean oil, or a blend of either or both such oils with Perilla oil. Also the charge of raw oil, added after the initial blowing, to dissolve and disperse the gel structure which has been formed up to that stage, may be an oil unlike the oil which is initially blown. In such case the proportions given above will nonetheless obtain. For example, if soya bean oil be blown to a viscosity of between 2500 Saybolt seconds and 3000 Saybolt seconds, and an equal weight of raw Perilla oil be then added, the permissible time of the secondary blow without incurring risk of gelation will be less than if the added oil were a raw soya bean oil. This decrease in the period of additional blowing is, however, approximately balanced by the higher drying qualities of the Perilla oil as such. It will be at once seen that this last-named blending is not equally desirable commercially, for the reason that it involves the addition of a more expensive raw oil, without adequate compensating advantage in the product.

The following theory is advanced, without necessary dependence thereon, to explain the remarkable improvements effected in the oils by subjecting them to the treatment given above. Initially it may be illustrated by comparing the composition of a raw soya bean oil, a raw linseed oil, and a treated soya bean oil.

Raw linseed oil contains the glycerides of oleic acids, linoleic acids, and linolenic acids in such proportion that the glycerides of the unsaturated fatty acids represent approximately 72% of the oil, while saturated fatty acid glycerides (preponderantly olein) are approximately 28% of it. Although these glycerides include relatively small proportions of stearin, palmitin, and palmitolein, olein so preponderates that the sum of these glycerides will hereinafter be referred to generically as "olein." When spread in a film, the oil dries by absorbing oxygen from the air, and gels are formed of the glycerides of the linoleic and linolenic acids, while the film is rendered continuous by the dispersing effect of the olein. Linseed oil is so balanced in its unsaturated and saturated constituents that in its raw condition the oil dries normally to a good coating.

Soya bean oil differs from linseed oil in that its content of olein is much greater than the olein content of linseed oil; thus when a film of raw soya bean oil is spread, and oxidation takes place, the dispersing effect of the olein on the gels formed by the oxidation of the unsaturated glycerides is so great that a very soft film is produced. When either linseed oil or soya bean oil is kettled, polymerization decreases the ability of its content of unsaturates to absorb oxygen, so that the drying time is lengthened. Polymerization in the oil has very little effect on the type of film produced, save that the increase in viscosity increases the flow of the oil. When either linseed or soya bean oil is blown, the unsaturates are given an initial oxygen addition, the linkage being relatively weak, so that the blown oils, when spread in a film, dry slightly faster than corresponding raw oils, but the inherent film characteristics of the oil are not greatly affected.

In the new treatments outlined above, the dispersing effect of the non-volatile, solvent olein is partially inhibited in the following manner:

When soya bean oil is preoxidized to a high stage of preoxidation, there is consequent increase in the size of the oxidized moles to a point at which gelation normally would take place if oxidation were continued. By adding raw oil, these large moles are then dispersed in normal moles, and blowing is continued. In this step of the process, blowing is continued to a stage in which the portion of the oil initially blown is converted to approximately its maximum gel structure, while the gels are held in dispersion by the partially oxidized other constituents of the oil. The treated oil then contains moles of oxidized linoleic and linolenic glycerides which have absorbed their full content of oxygen, and also contains moles on which only partial oxidation has been effected, the unsaturates in various degrees of oxidized condition being in decreased measure dispersed in the olein present. The large size of some of the moles requires a larger than normal amount of olein moles to coat them, and to render a film of the oil continuous.

Thus, it can be seen that by the treatment of my method I have in effect destroyed the property of the semi-drying soya bean oil (taken as exemplary) to dry to a tacky film. This is because the plasticizing action of the olein is expended in spreading over and coating moles of unusually great size, thereby decreasing the dispersive effect of the olein by rendering more exacting the performance of its primary function in imparting continuity to a film of the oil. The olein thus does not in normal measure inhibit further oxidation of the partially oxidized moles in a film of the oil, either to retard drying oxidation or to prevent its continuance to the stage of hard film formation.

I claim as my invention:

1. The herein described method of improving the rate of drying and film characteristics of film-forming oils of drying character which comprises subjecting such an oil to oxidation by blowing a gas containing free oxygen through a batch of raw oil of such sort while heating the batch to a temperature adequate to facilitate oxygen dispersion in the oil and below a temperature sufficient substantially to promote polymerization in the oil to a stage of oxidation at which the viscosity of the oil has been substantially increased and approaching the stage at which gelation of the oil would take place, at that stage dispersing the gel structure already formed in the oil with marked lowering in the viscosity of the batch by adding in the batch a charge of raw oil of generally similar character to that previously included in a quantity equal to from 20% to 70% the weight of the total batch formed by the addition, and continuing to oxidize the total batch by blowing under similar conditions to a stage at which by oxidation the viscosity of the total batch has been substantially increased and below a stage at which gelation in the batch takes place.

2. The herein described method of improving the rate of drying and film characteristics of raw film-forming oils of drying character in accordance with the procedure of claim 1, in which the oil of both the initial batch subjected to oxidation and of the raw charge added to make up the total batch is soya bean oil.

3. The herein described method of improving the rate of drying and film characteristics of raw film-forming oils of drying character in accordance with the procedure of claim 1, in which the oil of both the initial batch subjected to oxidation and of the raw charge added to make up the total batch is Perilla oil.

4. The herein described method of improving the rate of drying and film characteristics of raw film-forming oils of drying character in accordance with the procedure of claim 1, in which the oil of the batch initially oxidized and the oil of the raw charge added to make up the total batch are both oils of drying qualities but of specifically different characteristics.

5. The herein described method of improving the rate of drying and film characteristics of film-forming oils of drying character which comprises subjecting such an oil to oxidation by blowing a gas containing free oxygen through a batch of raw oil of such sort while heating the batch to a temperature adequate to facilitate oxygen dispersion in the oil and below a temperature sufficient substantially to promote polymerization in the oil to a stage of oxidation at which the viscosity of the oil has been substantially increased and approaching the stage at which gelation of the oil would take place, at that stage dispersing the gel structure already formed in the oil with marked lowering in the viscosity of the batch by adding in the batch a charge of raw oil of generally similar character to that previously included in a quantity equal to from 20% to 70% the weight of the total batch formed by the addition, and continuing to oxidize the total batch by blowing under similar conditions to a stage at which by oxidation the viscosity of the total batch has been increased to a viscosity within the approximate range of 500 Saybolt seconds to 1500 Saybolt seconds.

6. The herein described method of improving the rate of drying and film characteristics of raw film-forming oils of drying character in accordance with the procedure of claim 5, in which the oil of both the initial batch subjected to oxidation and of the raw charge added to make up the total batch is soya bean oil.

7. The herein described method of improving the rate of drying and film characteristics of raw film-forming oils of drying character in accordance with the procedure of claim 5, in which the oil of both the initial batch subjected to oxidation and of the raw charge added to make up the total batch is Perilla oil.

8. The herein described method of improving the rate of drying and film characteristics of raw film-forming oils of drying character in accordance with the procedure of claim 5, in which the oil of the batch initially oxidized and the oil of the raw charge added to make up the total batch are oils of generally similar but specifically different characteristics.

9. The herein described method of improving the rate of drying and film characteristics of film-forming oils of drying character which comprises subjecting such an oil to oxidation by blowing a gas containing free oxygen through a batch of raw oil of such sort while heating the batch to a temperature adequate to facilitate oxygen dispersion in the oil and below a temperature sufficient substantially to promote polymerization in the oil to a stage of oxidation at which the viscosity of the oil has been increased to within the approximate range of 2500 Saybolt seconds to 3000 Saybolt seconds and approaches the stage at which gelation of the oil would take place, at that stage dispersing the gel structure already formed in the oil with marked lowering in the viscosity of the batch by adding in the batch a charge of raw oil of generally similar character to that previously included in a quantity equal to from 20% to 70% the weight of the total batch formed by the addition, and continuing to oxidize the total batch by blowing under similar conditions to a stage at which by oxidation the viscosity of the total batch has been increased to a viscosity within the approximate range of 500 Saybolt seconds to 1500 Saybolt seconds.

10. The herein described method of improving the rate of drying and film characteristics of raw film-forming oils of drying character in accordance with the procedure of claim 9, in which the oil of both the initial batch subjected to oxidation and of the raw charge added to make up the total batch is soya bean oil.

11. The herein described method of improving the rate of drying and film characteristics of raw film-forming oils of drying character in accordance with the procedure of claim 9, in which the oil of both the initial batch subjected to oxidation and of the raw charge added to make up the total batch is Perilla oil.

12. The herein described method of improving the rate of drying and film characteristics of raw film-forming oils of drying character in accordance with the procedure of claim 9, in which the oil of the batch initially oxidized and the oil of the raw charge added to make up the total batch are oils of generally similar but specifically different characteristics.

FRANK W. CORKERY.